United States Patent
Buck et al.

(10) Patent No.: US 9,213,535 B1
(45) Date of Patent: Dec. 15, 2015

(54) PRE-COMPUTING COMPUTER SOFTWARE PATCH SOLUTIONS

(75) Inventors: Keith R. Buck, Ft. Collins, CO (US); Robert E. Campbell, Ft. Collins, CO (US); Evan R. Zweifel, Ft. Collins, CO (US); Robert William Fritz, Ft. Collins, CO (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 1842 days.

(21) Appl. No.: 11/590,165

(22) Filed: Oct. 31, 2006

(51) Int. Cl.
*G06F 9/44* (2006.01)
*G06F 9/45* (2006.01)
*G06F 9/445* (2006.01)

(52) U.S. Cl.
CPC .................................. *G06F 8/65* (2013.01)

(58) Field of Classification Search
USPC .......................................................... 717/168
See application file for complete search history.

(56) References Cited

U.S. PATENT DOCUMENTS

| | | | | |
|---|---|---|---|---|
| 6,161,218 A * | 12/2000 | Taylor | | 717/174 |
| 6,389,370 B1 * | 5/2002 | Delaney et al. | | 702/186 |
| 6,477,703 B1 * | 11/2002 | Smith et al. | | 717/168 |
| 6,763,517 B2 * | 7/2004 | Hines | | 717/124 |
| 6,954,928 B2 * | 10/2005 | Allsop et al. | | 717/168 |
| 7,020,875 B2 * | 3/2006 | Zweifel et al. | | 717/168 |
| 7,080,371 B1 * | 7/2006 | Arnaiz | | G06F 8/65 717/168 |
| 7,451,440 B2 * | 11/2008 | Zweifel | | 717/168 |
| 7,552,430 B2 * | 6/2009 | Napier et al. | | 717/169 |
| 7,559,058 B2 * | 7/2009 | Blumfield et al. | | 717/172 |
| 7,562,356 B2 * | 7/2009 | DeFolo | | 717/169 |
| 7,603,668 B2 * | 10/2009 | Zweifel et al. | | 717/174 |
| 7,617,519 B2 * | 11/2009 | Williams | | 726/1 |
| 7,747,998 B2 * | 6/2010 | Napier et al. | | 717/172 |
| 7,765,538 B2 * | 7/2010 | Zweifel | | G06F 8/65 717/168 |
| 7,853,943 B2 * | 12/2010 | McCaleb et al. | | 717/173 |
| 9,038,051 B1 * | 5/2015 | Zweifel | | G06F 8/65 717/169 |
| 2002/0174422 A1 * | 11/2002 | Kelley et al. | | 717/178 |
| 2003/0033313 A1 * | 2/2003 | Zweifel et al. | | 707/100 |
| 2003/0033597 A1 * | 2/2003 | Allsop et al. | | 717/169 |
| 2004/0205709 A1 * | 10/2004 | Hiltgen et al. | | 717/115 |
| 2005/0188258 A1 * | 8/2005 | Zweifel et al. | | 714/23 |
| 2005/0210285 A1 * | 9/2005 | Williams | | 713/201 |
| 2006/0064685 A1 * | 3/2006 | DeFolo | | 717/169 |
| 2006/0080656 A1 * | 4/2006 | Cain | | G06F 8/65 717/174 |
| 2006/0101457 A1 * | 5/2006 | Zweifel | | G06F 8/65 717/174 |

\* cited by examiner

*Primary Examiner* — Marina Lee
(74) *Attorney, Agent, or Firm* — Clifton L. Anderson

(57) ABSTRACT

The present invention provides for precomputing patch solutions for potential user issues. The precomputed patch solutions can include minimum patch solutions and best-like-me patch solutions. Each patch solution can include a patch and a sufficient set of one or more dependencies of that patch.

14 Claims, 1 Drawing Sheet

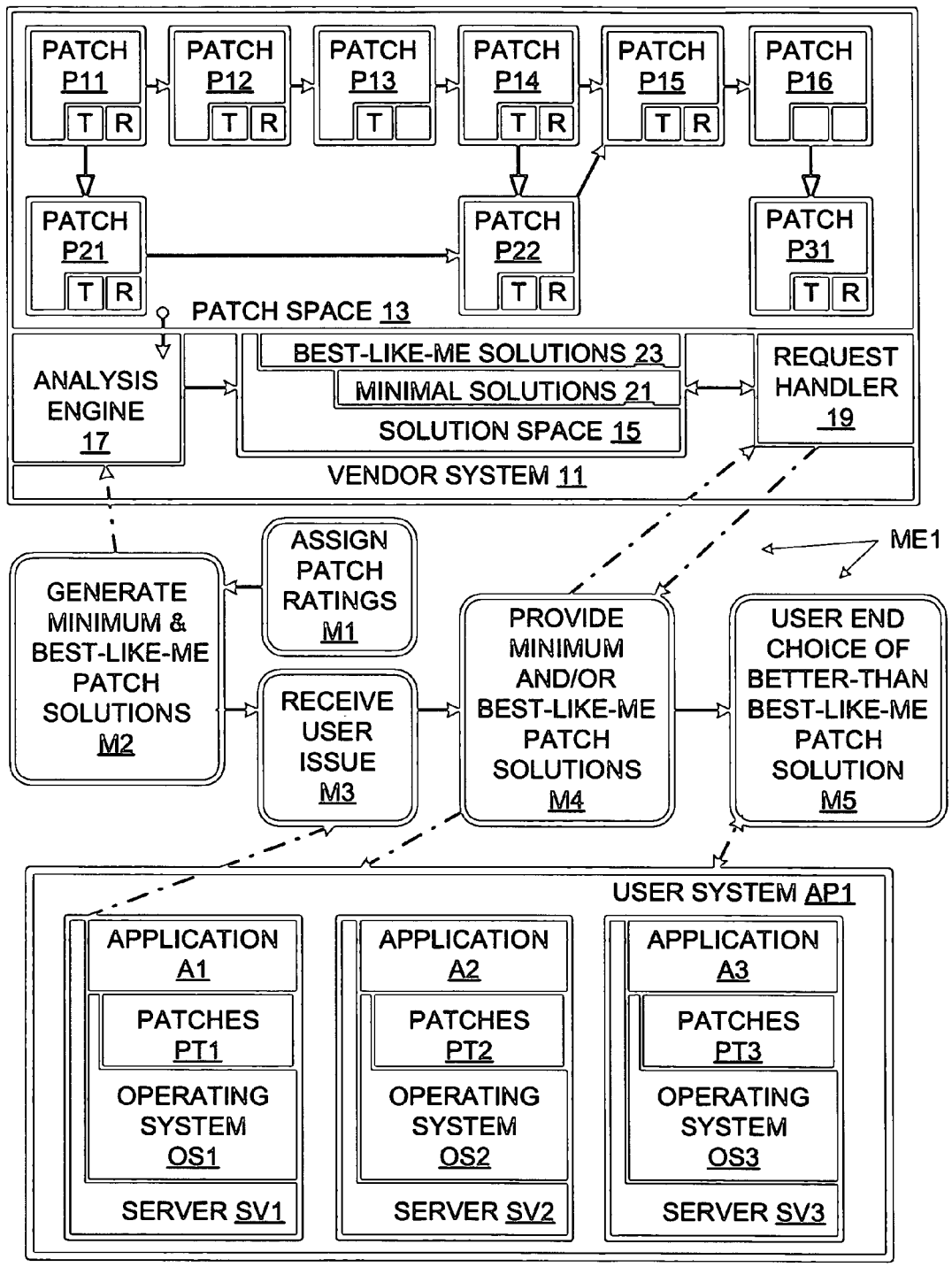

PRE-COMPUTING COMPUTER SOFTWARE PATCH SOLUTIONS

BACKGROUND OF THE INVENTION

Herein, related art may be discussed to put the invention in context. Related art labeled "prior art" is admitted prior art; related art not labeled "prior art" is not admitted prior art.

Regardless of the amount of pre-release testing, computer software is rarely flawless when it is released. Security issues, compatibility issues, and other problems may be discovered post release. Accordingly, software developers can release patches to update the software. In the case of some operating systems, hundreds or thousands of patches may be available, so that users often rely on the operating system developer for recommendations regarding which patches to install.

While it might seem advantageous to simply install the latest version of all patches, there are many situations in which this is not done. New patches can introduce new problems, and may not be tested on some system configurations. Some "restrictive" users do not want to "disturb" their systems any more than necessary; such users tend to address only actual problems or important security issues. Other users may be may be reluctant to install patches that have not been extensively vetted in the field.

Accordingly, a solution provider typically takes into account both the configuration of the system being patched and the user's preferences regarding patching in general. When a particular problem or security issue is identified, the solution provider can determine the configuration of the user system and determine what patches address the problem or issue. The user preferences can help select among the solution patches.

When a large number of patches are involved, some patches require other patches be installed with them. When a patch is selected to address a user issue, the patch space has to be analyzed to determine its dependencies so they can be induded in the solution. This analysis can be quite complex and must often be repeated for users with multiple systems with different configurations. The present invention addresses the problem of having to perform intensive dependency analyses every time a patch solution is required. This and other problems addressed by the invention are apparent from the description below with reference to the following FIGURE.

BRIEF DESCRIPTION OF THE DRAWING

The following drawing is of embodiments of the invention and not of the invention itself.

FIG. 1 is a combination schematic illustration and flow chart showing a vendor system, a user system, and a method by which the vendor system offers solutions to the user system in accordance with embodiments of the invention.

DETAILED DESCRIPTION

The present invention provides for dependencies for certain types of solutions to be pre-computed (i.e., computed prior to a user request for the resulting solution) independent of the user system configuration. The solutions include "minimum" and "best-like-me" solutions that are likely to appeal to many restrictive and conservative users. Where these solutions are appropriate, dependency computations are minimized or avoided at the time the solution is required. This allows an issue to be addressed faster, and obviates the need to recompute dependencies for each variation in computer configuration.

The minimum solution is a solution including the earliest patch that addresses a given issue along with all patches on which that patch depends. A best-like-me solution is the best solution according to some criterion selected from a set of solutions including the respective minimum solution and modifications to that minimum solution involving replacing one or more patches with successor patches without introducing any new dependencies. Another name for a best-like-me solution is "best-like-minimum" solution.

A user system AP1 includes multiple servers, including servers SV1, SV2, and SV3. Each server has a respective operating system instance OS1, OS2, and OS3 updated with patches PT1, PT2, and PT3. A respective application program A1, A2, A3 is running on respective operating systems OS1, OS2, OS3. More generally, the invention provides for any number of user server systems and they can be partitioned or not, partitions can be hard or virtual, and virtual machines can be run on the partitions or systems. In the present case, operating systems OS1-OS3 are differently configured instances of the same base operating system, the vendor for which runs vendor system 11.

Vendor system 11 includes a patch space 13, a solution space 15, an analysis engine 17, and a request handler 19. Request handler 19 handles requests from user system AP1. The requests can be for a patch to address a particular problem or issue. For example, the request can be to: 1) address a logic defect in the operating system or program; 2) address a compatibility issue with certain hardware; 3) address a compatibility issue with other software; 4) update a system to handle security threats; or 5) other issues.

Request handler 19 forwards requests to analysis engine 17 which can determine whether a completely pre-computed solution, a partially pre-computed solution, or an ad hoc solution is required. A solution that is not pre-computed can be appropriate where the request includes configuration information for the server on which an issue arose and where no pre-computed solution effectively addresses that issue for that configuration. Completely computed solutions can be used where no configuration information is available for the target user system or where a pre-computed solution optimally addresses the user's issue. Partially computed solutions can be appropriate where a partially pre-computed solution addresses a user issue, but configuration information is available to fine-tune the solution.

Where possible, pre-computed solutions are used. Pre-computed solutions require only one analysis but can be applied to different systems. Also, the analysis is done beforehand so that latency between request and solution is minimized. In the illustrated case, minimal solutions 21 and best-like-me solutions 23 are pre-computed.

A "minimum" solution is one type of pre-computed solution. A solution is "minimum" if it contains only the earliest patch that addresses a problem and that patch's earliest dependencies. A best-like-me solution can be derived from a minimum solution by replacing one or more patches with successors that meet some "best" criterion but that do not introduce new dependencies. In some cases, the "best like me" and "minimum" solutions are the same—e.g., where there are no qualified successors to the patches in the minimum patch solution.

For some user system configurations, the best solution may be related to but different from a minimum or best-like-me solution. Where this "better" solution can be pre-identified, it can be presented along with the minimum or best-like-me solution. The user can then determine whether to implement the minimum or best-like-me solution or a pre-identified alternative based on the user system configuration. Where the final solution is configuration dependent, it is said to be "partially pre-computed".

Patch space 13 includes thousands of patches; patches P11-P16, P21, P22, and P31 are represented. Patch P11 is the earliest patch that addresses a specific potential user issue, while patches P12-P16 are successors that also address that issue, as indicated by the inter-patch arrows with solid heads. Patches P11 requires that patch P21 be installed as indicated by the open headed interpatch arrow between patch P11 and patch P21; alternatively, the successor patch P22 to patch P21 can be used instead of patch P21 to meet the dependency requirements of patch P11.

Patches P12 and P13 have the same dependency requirements as patch P11. Patch P14 requires patch P22, as indicated by the open headed arrow between these patches; patch P21 does not meet the dependency requirements for patch P14. Patch P15 is a successor to both patch P14 and patch P22, in effect merging two patch successor lines. Patch P15 has no dependency requirements. Its successor, patch P16 has a new dependency requirement, patch P31.

For one example, if patch P11 is the earliest patch to address a given user problem, then the minimum solution includes patch P11 and its dependency P21. For the "best" solutions, there are alternatives depending on how "best" is defined and how "new dependencies" is defined.

For example, if patch P22 is considered a new dependency, the best-like-me solution could be patch P13 and patch P21, as patch P13 is the latest patch having the same dependency as minimum patch P11. However, patch P13 has been tested but not found reliable (as indicated by the "T" and blank boxes). Accordingly, if "best" is defined to require patches tested and found reliable, the best-like-me solution can be P12 and P21.

If patch P22, as a successor to patch P21, is not considered to introduce a new dependency, patch P16 would be the first patch to introduce a new dependency, i.e., patch P31, which is not a successor to patch P21. In this case, patch P15 would qualify as the best-like-me patch solution. As it has no dependency, patch P15 would be the complete solution.

As mentioned above, it may be apparent that solutions better than the best-like-me solution may be available depending on the configuration of the user server. For example, a successor to a best-like-me solution patch might be a better solution on systems in which the new dependency associated with the successor is already installed on the user system. Such contingencies can be stored as meta-data for the best-like-me solution patch. Such solutions are partially pre-computed as the user system may perform some computation based on the meta-data to determine whether the best-like-me or the successor patch solution is better for the target user system.

The invention provides for a method ME1 in which patch ratings are assigned to patches at method segment M1. At method segment M2, minimum and best-like-me solutions are pre-generated. When a user request is received (e.g., by patch handler 19, at method segment M3) a minimum or best-like-me solution can be provided to the user at method segment M4. Finally, if the best-like-me solution indicates a better solution based on user system configuration, the better solution can be determined at the by user system AP1 at method segment M5.

The invention is computationally efficient as many dependencies are computed once and used multiple times. The computations are collocated with the updated patch space on vendor system 11, so the computations are always up to date. This contrasts with approaches in which the computations are carried out at the user system based on pre-determined algorithms that may be out of date. User privacy is protected because configuration data need not be sent to the solution provider for a solution to be generated.

The solutions provided for by the present invention comprise combinations of two or more patches. However, practical embodiments of the invention also provide solutions that consist of a single patch.

While a relatively simple example of a patch family tree is shown in FIG. 1, the invention is scalable to vastly larger and more complex patch spaces. Patches can be rated in many different ways, and these ratings can be considered in defining "best" in a "best-like-me" solution. Solutions can be presented to the user as a single solution or as a set of solutions that the user can select from, e.g., based on preferences and server configurations. These and other variations upon and modifications to the illustrated embodiments are provided for by the present invention, the scope of which is defined by the following claims.

What is claimed is:

1. A computer-implemented method comprising:
pre-computing solutions for a potential user issue, said pre-computing being performed independently of a configuration of a user system, said pre-computing including:
identifying a minimum patch solution including only an earliest patch addressing said potential user issue, and at least one patch upon which said earliest patch depends;
identifying a best-like-minimum patch solution derived from said minimum patch solution by replacing said earliest patch of said minimum patch solution with a successor patch meeting a criterion without introducing any new dependencies, said successor patch of said best-like-minimum patch solution addressing said potential user issue and depending upon said at least one patch upon which said earliest patch depends; and
in response to an actual user issue arising after said pre-computing and corresponding to said potential user issue, providing said minimum patch solution or said best-like-minimum patch solution to a user.

2. A method as recited in claim 1, further comprising assigning ratings to a plurality of patches, said best-like-minimum patch solution being selected at least in part as a function of said ratings, said best-like-minimum patch solution including at least one patch not included in said minimum patch solution.

3. A method as recited in claim 2, wherein each of said ratings indicate how reliable a respective patch of said plurality of patches is expected to be.

4. A method as recited in claim 1, wherein said provided best-like-minimum patch solution includes information permitting the user to select between said provided best-like-minimum patch solution and another solution based on said configuration of said user system.

5. A method as recited in claim 4, wherein said another solution contains a successor to a patch in said best-like-minimum patch solution, said successor having a dependency on a patch already installed on said user system.

6. A method as recited in claim 1, wherein said earliest patch and said at least one patch of said minimum patch solution comprise corresponding software patches, and wherein said successor patch in said best-like-minimum patch solution comprises a software patch.

7. A system comprising:
- an analysis engine to pre-compute, without regard to a configuration of a particular user system, solutions for a potential issue of a program, said pre-computing including:
  - identifying a minimum patch solution including only an earliest patch addressing said potential issue, and at least one patch upon which said earliest patch depends,
  - identifying a best-like-minimum patch solution derived from said minimum patch solution by replacing said earliest patch of said minimum patch solution with a successor patch meeting a criterion without introducing any new dependencies, said successor patch of said best-like-minimum patch solution addressing said potential issue and depending upon said at least one patch upon which said earliest patch depends;
- a request handler to respond to an actual issue regarding said particular user system and corresponding to said potential issue by providing to a user at least one of said minimum patch solution or said best-like-minimum patch solution; and
- at least one central-processing unit on which said analysis engine and said request handler are executable.

8. A system as recited in claim 7, wherein said analysis engine is to use ratings assigned to a plurality of patches to determine said best-like-minimum patch solution.

9. A system as recited in claim 8, wherein each of said ratings indicate how reliable a respective patch of said plurality of patches is expected to be.

10. A system as recited in claim 7, wherein said request handler is to provide said best-like-minimum patch solution that includes information permitting the user to select between said best-like-minimum patch solution and another solution based on said configuration of said particular user system.

11. A system as recited in claim 10, wherein said another solution contains a successor to a patch in said best-like-minimum patch solution, said successor having a dependency on a patch already installed on said particular user system.

12. A system as recited in claim 7, wherein said earliest patch and said at least one patch of said minimum patch solution comprise corresponding software patches, and wherein said successor patch in said best-like-minimum patch solution comprises a software patch.

13. A non-transitory computer-readable storage medium storing instructions that upon execution cause a system to:
- pre-compute solutions for a potential issue of a program, said pre-computing being performed independently of a configuration of a user system, said pre-computing including:
  - identify a minimum patch solution including only an earliest patch addressing said potential issue, and at least one patch upon which said earliest patch depends;
  - identify a best-like-minimum patch solution derived from said minimum patch solution by replacing said earliest patch of said minimum patch solution with a successor patch meeting a criterion without introducing any new dependencies, said successor patch of said best-like-minimum patch solution addressing said potential issue and depending upon said at least one patch upon which said earliest patch depends; and
- in response to an actual issue arising after said pre-computing and corresponding to said potential issue, provide said minimum patch solution or said best-like-minimum patch solution to a user.

14. A non-transitory computer-readable storage medium as recited in claim 13, wherein said earliest patch and said at least one patch of said minimum patch solution comprise corresponding software patches for the program, and wherein said successor patch in said best-like-minimum patch solution comprises a software patch for the program.

* * * * *